INVENTORS
ALBERT T. KAPITKE
FREDERICK A. BAUROTH.
BY
ATTORNEY

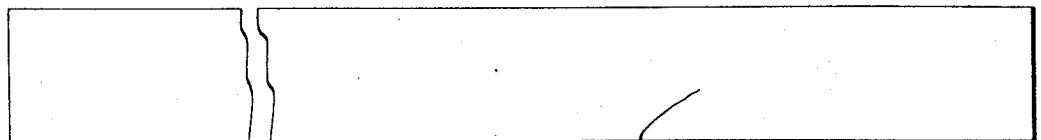
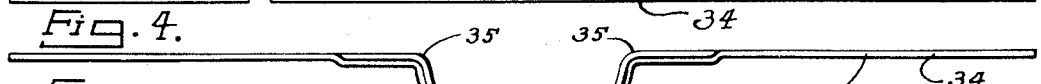
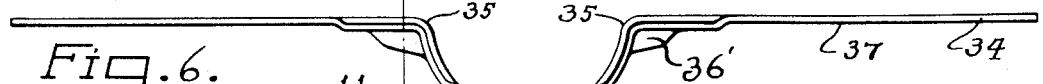
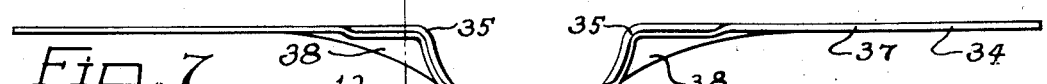
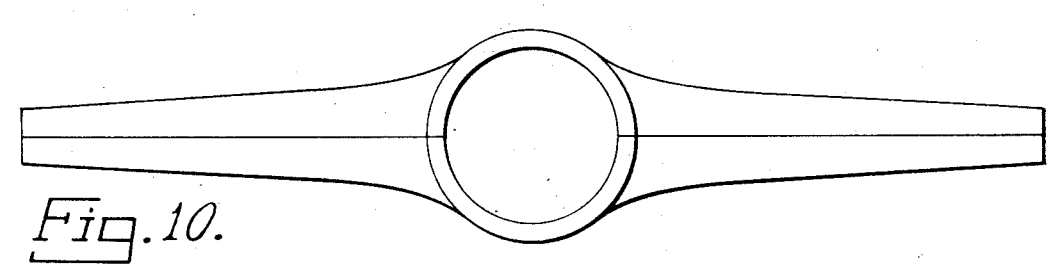
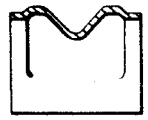
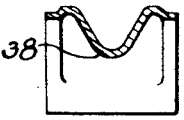
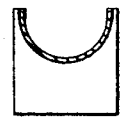
INVENTORS
ALBERT T. KAPITKE.
FREDERICK A. BAUROTH.
BY
ATTORNEY.

Patented Dec. 19, 1933

1,940,305

UNITED STATES PATENT OFFICE 1,940,305

METHOD OF MAKING REAR AXLE HOUSINGS

Albert T. Kapitke and Frederick A. Baurroth, Detroit, Mich., assignors to Chrysler Corporation, Detroit, Mich., a corporation of Delaware Application November 22, 1930
Serial No. 497,476

6 Claims. (Cl. 29—153.1)

This invention relates to an improved axle housing of the type used in motor vehicle construction and particularly to an improved method for producing axle housings of this kind by punching die forming operations.

Heretofore, it has been the practice to form all axle housings from sheet metal blanks which have laterally protruding metal sections at their intermediate portions for providing sufficient metal at proper locations of the tubular end structures which adjoin the opposite sides of the differential casing of the housings. The formation of irregular shaped blanks of this kind involves a substantial waste of stock. In some instances metal flanges or laterally protruding parts of metal are welded to the side edges of a blank of rectangular formation, but usually such operations increase the cost of production more than the saving effected by obviating waste of the stock.

The main objects of the invention are to provide a method for forming a rear axle housing from a rectangular piece of metal stock of uniform thickness; to provide a method of this character which does not require the addition of protruding sections; to provide a method of this kind by which the dimensions of selected portions of the blank are increased so as to provide sufficient stock for the formation of the flared ends of the tubular section that adjoin the differential casing of the housing; to provide stretching operations for this purpose during which the areas operated upon are modified to a formation approaching in cross sectional contour that of the contour of the corresponding portions in the finished product; to provide successive stretching operations in a method of this kind by which the thicknesses of the stretched parts of the blank are substantially uniformly reduced throughout the stretched areas; and to provide stretching operations of this kind which leave the blank in a formation from which it can be conveniently modified to its final shape.

An illustrative embodiment of the invention is shown in the accompanying drawings, in which:

Fig. 1 is a fragmentary transverse vertical section of a progressive die stamping apparatus illustrating the stretching operations employed in the improved method for forming axle housings.

Fig. 2. is a fragmentary longitudinal section taken on the line 2—2 of Fig. 1 and illustrating the initial forming and first stretching operations at the right and left sides of the figure, respectively.

Fig. 4 is a fragmentary plan view of a rectangular blank of the type from which an axle housing is formed by the improved method.

Fig. 5 is a side elevation showing the blank as it appears after the initial forming and clamping operation.

Fig. 6 is a view similar to Fig. 5, showing the effect on the blank of the first stretching operation.

Fig. 7 is a view like Fig. 5, but showing the combined effects of the first and second stretching operations.

Fig. 8 is a view similar to Fig. 5, showing the combined effects on the blank of all the stretching operations to which it is subjected.

Fig. 9 is a side elevation of a completely formed half section of a rear axle housing.

Fig. 10 is a side elevation of an assembled rear axle housing.

Fig. 11 is a transverse vertical section taken on the line 11—11 of Fig. 6.

Fig. 12 is a transverse vertical section taken on the line 12—12 of Fig. 7.

Fig. 13 is a transverse vertical section taken on the line 13—13 of Fig. 8.

Fig. 14 is a transverse vertical section taken on the line 14—14 of Fig. 9.

In this improved rear axle housing forming process, the intermediate portions of a rectangular piece of sheet metal stock of uniform dimension are first bent into substantially semi-cylindrical shape and then the longitudinal edges of the blank are firmly clamped between die clamps throughout their entire lengths. Selected areas of the stock are subjected to successive deforming operations by punches of increasing dimensions, while the side portions of the stock are firmly held against displacement so as to increase the areas and particularly the width of the selected portions. The selected areas of the stock are preferably modified during the deforming or stretching operations to a formation which has a cross section that approaches the contour of the finished product at the locations of these areas therein.

Figure 1:
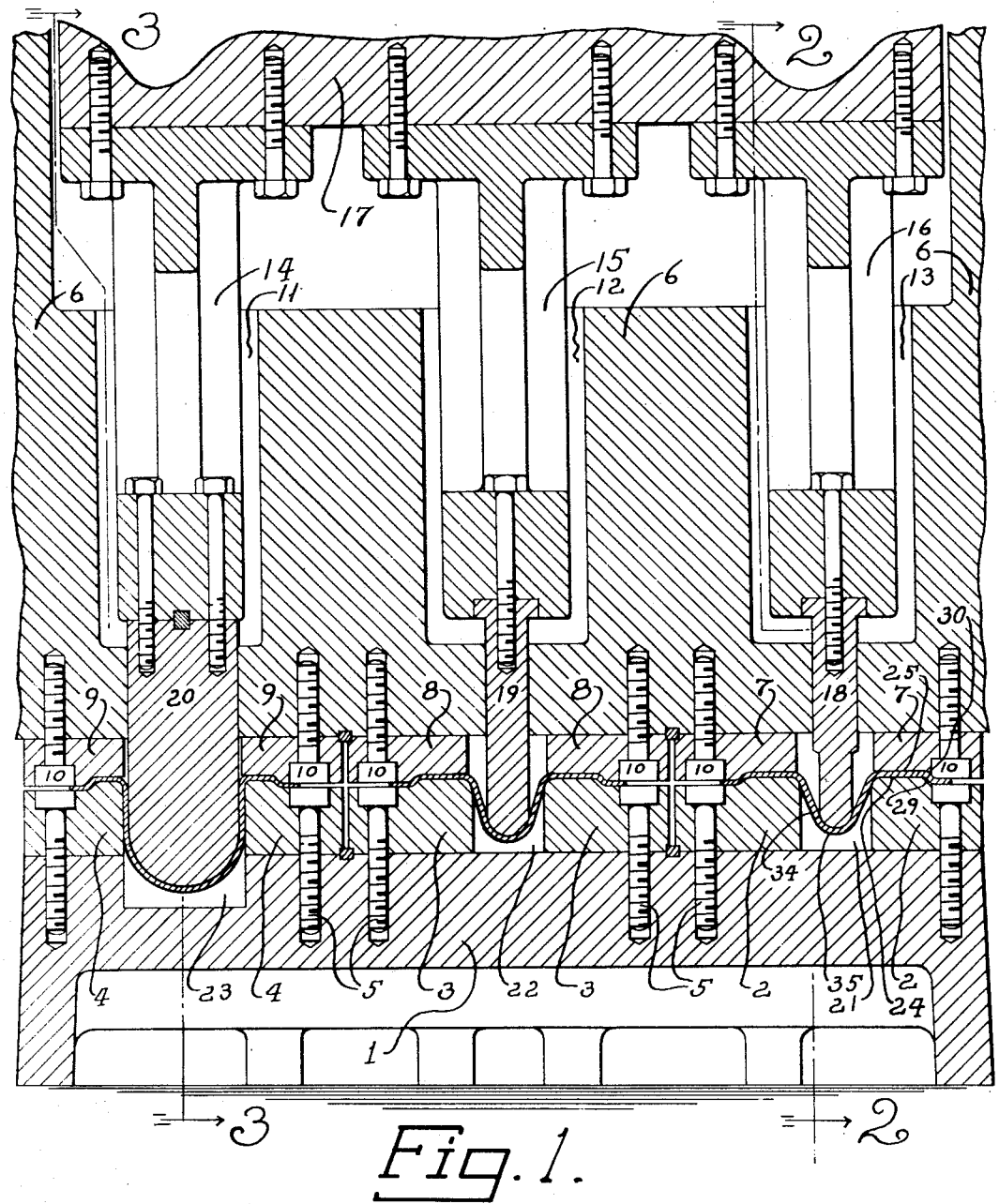

The various operations of the improved axle forming method are preferably conducted on a progressive die stamping or punching machine of the type illustrated in Fig. 1 of the drawings, but if desired, any punching apparatus may be used. The apparatus shown includes a lower bed portion 1 on which are mounted adjacent pairs of jaw members 2, 3 and 4. The lower jaws 2, 3 and 4 being secured to the bed 1 by screws 5. Slidably mounted on a supporting structure of the machine (not shown) is a die clamping member 6 on which jaws 7, 8 and 9 are mounted by screws 10, the pairs of jaws 7, 8 and 9 being in registration with the pairs of jaws 2, 3 and 4, respectively. Extending into vertical passages 11, 12 and 13 formed in the die clamping member 6 are posts 14, 15 and 16, respectively which are carried by a reciprocating ram 17. The posts 14, 15 and 16 are provided at their lower extremities with punching tools 18, 19 and 20 which register respectively with the spaces 21, 22 and 23 between the pairs of jaws 2, 3 and 4 as illustrated in Fig. 1. The punching tools each have a substantially semi-circular curvature at their outer extremities and they vary in thickness, the tool 18 having less thickness than the tool 19 and the latter tool being thinner than the tool 20.

Each longitudinal side portion of the bed 1 and die clamping member 6 are provided with pairs of jaws like jaws 2, 3 and 4; and 7, 8 and 9, respectively which register with each other. The registering jaws 2 and 7 of the bed 1 and die clamping member 6, respectively, are typical of all the co-operating jaws and they have straight co-operating surfaces 24 and 25 and arcuately curved faces 26 and 27 which are located at the intermediate, recessed portion 28 of the bed 1. The outer edge portions of the straight surfaces 24 and 25 and the arcuate surfaces 26 and 27 are offset at 29 and 30, respectively as shown in Fig. 1, so as to clamp the longituidnal side edges of a blank in the manner illustrated.

Provided on the die clamping member 6 is a forming shoe or die part 31 which is secured to an extension 32 of the die clamping member 6 by screws 33. This forming element is located in advance of the jaws 7 and in registration with the intermediate recessed portion 28 of the bed 1. The punching units of the successive stages of the forming apparatus which includes jaws 3 and 8 and jaws 4 and 9 are substantially identical to the above unit, as they vary only in the dimensions of the spaces between the jaws and thickness of the punching tools. The die clamping member 6 and the ram 17 are operated in a predetermined timed relation by mechanism (not shown) which brings all of the jaws of the three units into clamping relationship slightly before the punching tools 18, 19 and 20 are received in the spaces 21, 22 and 23, respectively between the jaws.

In operation, a rectangular blank 34 of substantially uniform thickness is placed upon the jaws 2 of the first unit of the apparatus with its intermediate portion in registration with the spaces 21 between the jaws 2 of both longitudinal sides of the bed 1. The die clamping member 6 is pressed upon the blank 34 with sufficient force to hold the sides thereof against displacement and to crimp the edge portions as illustrated at 30. During downward movement of the die part 6, the forming shoe or member 31 presses the intermediate portion of the blank 34 into the intermediate recessed part 28 of the bed 1 forming a substantially semi-cylindrical section midway between the outer ends of the blank from which one-half section of the differential casing of an axle housing is later produced. Then the ram 17 moves downwardly carrying the punch 18 into the space 21 between the jaws 2.

The punch 18 which, in addition to being rounded at its outer edge, also has bottom edge portions that converge substantially at a point, strikes central areas of the blank which are located at the adjoining portions 35 of the intermediate parts 36 and the outer parts 37 of the blank 34 and deforms or bends the adjoining portion 35 inwardly between the jaws 2. This action stretches the metal of the adjoining portions 35 increasing the metal area of the blank at these locations as illustrated at 36' in Fig. 6.

Figure 2:
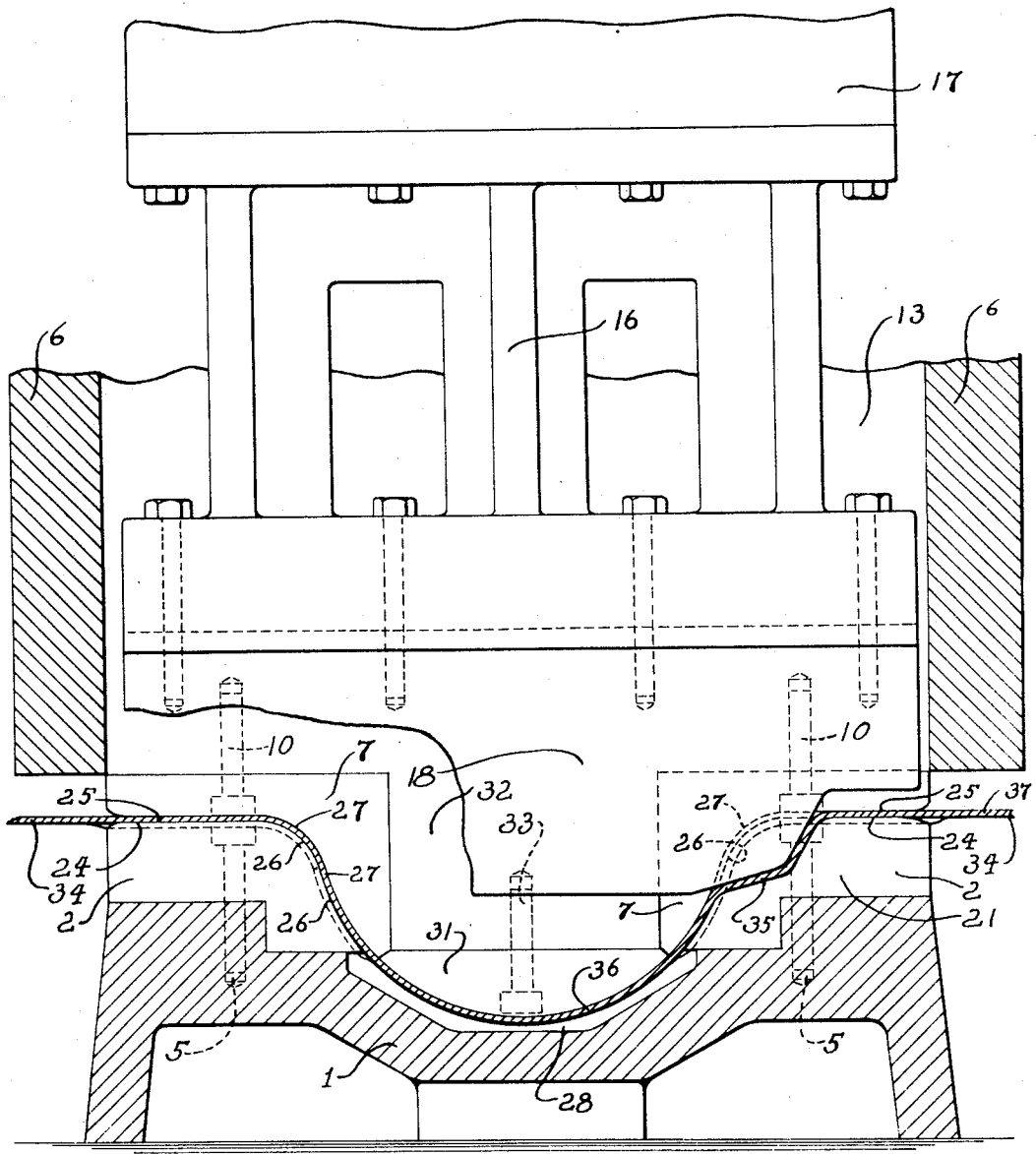
Figure 3:
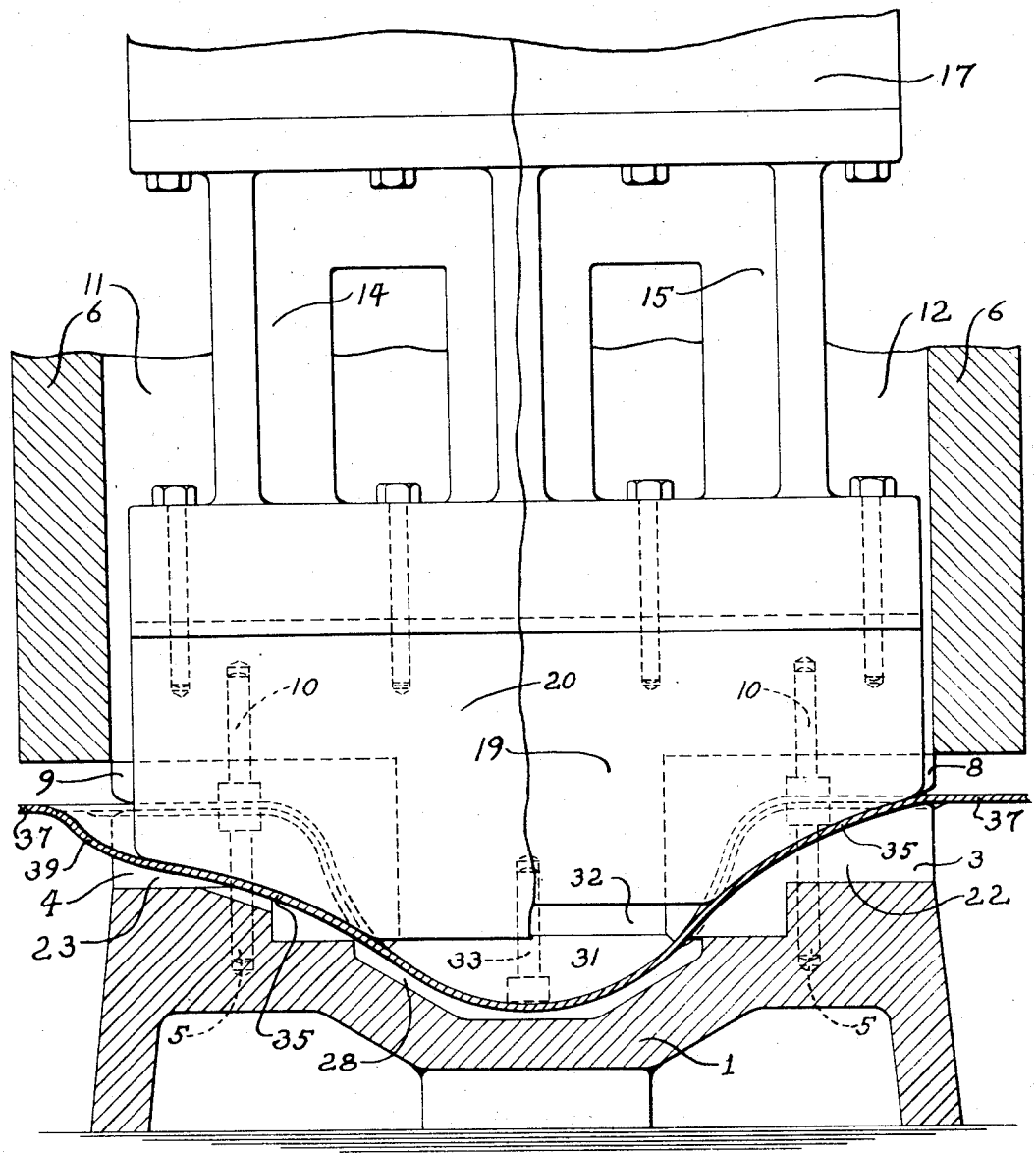
Fig. 3 is a fragmentary longitudinal section taken on the line 3—3 of Fig. 1 illustrating the second and third stretching operations at the right and left sides of the figure, respectively.

The die clamping member 6 is raised and the blank 34 is advanced in position to the next punching unit where it is placed upon the jaws 3 of the bed. Then the die clamping member 6 is moved to its clamping position and the ram 17 is moved downwardly carrying the punching tool 19, which is wider than the punching tool 18 and which has a slightly reversely bowed bottom edge, into the space 22 between the jaws 3. This action straightens out the metal at the adjoining portions 35 of the intermediate section 36 and the outer parts 37 of the blank from the shape shown at the right in Fig. 2 to the shape shown at the right in Fig. 3. During the second stretching operation the central areas of the adjoining portions 35 are modified to trough formation shown at 38 in Figs. 7 and 12, the bottom wall of the trough being substantially tangent to the arcuate curvature of the intermediate part 35 of the blank.

The ram 17 and die clamping member 6 are again lifted and the blank is advanced from the second punching unit to the third punching unit where it is seated upon the jaws 4 and again clamped against displacement by the jaws 9 of the member 6. Then the ram descends and forces the punching tool 20 into the space 23 between the jaws. This operation, illustrated at the left side of Fig. 3, bends the adjoining portions 35 of the intermediate and outer parts of the blank downwardly and forms the trough at the central areas of the adjoining portions substantially to the size, shape and contour desired in the finished product at these locations. The outer extremities 39 of the adjoining portions 35, being unsupported during the latter operation, are deflected downwardly and stretched under the action of the punch 20. After the three successive stretching operations, a blank which initially had a width of seven inches is stretched until the adjoining portions, if flattened out, would have a width of substantially nine inches.

At this stage of the method the blank has a shape like that illustrated in Fig. 8 and it is in condition for the final die forming operation which modifies the blank to the formation shown in Fig. 9, producing a half section of a rear axle housing. The dies (not shown) used in the final forming operation, correspond in shape to the inner and outer sides of the axle housing. They are adapted to bend the previous clamped side portions of the blank into alignment with the sides of the trough, to straighten out the crimp formed during the clamping operation, and to modify the outer parts 37 of the blank 34 to semi-cylindrical formation, as shown at 40 in Fig. 9.

The stretched portions of the blanks are worked into tangential relationship with the curvature of the differential casing forming flared ends at the inner extremities of the outer portions 37 of the blank which, during the final forming operation, are brought to tubular formation. In this manner sufficient breadth is imparted to the portions of the original rectangular blank 34 to enable the formation of these flared parts of the structure without requiring the addition of extra material. This stretching operation reduces the thickness of the stock at the adjoining portions of the differential housing and outer tubular portions of the rear axle housing, but the structural weakening effect of the reduction in thickness is offset by the strengthening effect of the increased size of the inner ends of the tubes.

Although but one specific embodiment of this invention has herein been shown and described, it will be understood that various changes in the size, shape and arrangement of parts may be made without departing from the spirit of our invention and it is not our intention to limit its scope other than by the terms of the appended claims.

What we claim is:

1. In manufacturing a rear axle housing having a differential casing at its intermediate portion and including tubular outer parts having flared ends adjoining said differential casing, the method of making a section of said housing from a rectangular blank of uniform thickness which consists in bending the intermediate part of said blank into an arcuate shape, die clamping the longitudinal edges of said blank at adjoining portions of said intermediate part and the outer portions of said blank against displacement, depressing only the central areas of the end portions of said intermediate part and the adjoining outer portions of the blank to a formation approaching the contour of the flared ends of said tubular parts while the edge portions of said blank are held against displacement so as to stretch the metal at said adjoining portions to the perimeters desired at the flared ends of the tubular parts of the housing, and modifying said blank to the formation of a finished section of a rear axle housing between dies having contours conforming with the inner and outer sides of an axle housing respectively.

2. In manufacturing a rear axle housing having a differential casing at its intermediate portion and including tubular outer parts having flared ends adjoining said differential casing, the method of making a section of said housing from a rectangular blank of uniform thickness which consists in bending the intermediate part of said blank into an arcuate shape, die clamping the longitudinal edges of said blank at the adjoining portions of said intermediate part and the outer portions of said blank against displacement, forming trough shaped depressions only at the central areas of the adjoining portions of said intermediate part and the outer portions of the blank having their lower sides approaching a tangential relationship with said arcuate intermediate portion while the edge portions thereof are held against displacement so as to stretch the metal at said adjoining portions substantially to the perimeters and contour desired at the flared ends of the tubular parts of the housing, and modifying said blank to the formation of a finished section of a rear axle housing between dies having contours conforming with the inner and outer sides of an axle housing respectively.

3. The method of forming a rear axle housing including an annular differential casing and tubular end sections having frusto-conical shaped inner end portions joined with said differential casing which consists in bending the intermediate portion of a rectangular blank to provide a transversely disposed intermediate arcuate section, stretching the adjoining parts of said arcuate section and the end portions of said blank between its longitudinal edges to a formation approaching the cross sectional contour of said frusto-conical portions and simultaneously increasing the area of said adjoining portions, modifying said blank to the formation of a finished section of a rear axle housing, and securing a pair of such sections together.

4. In manufacturing a rear axle housing including an annular differential casing and tubular end parts having frusto-conical shafted inner end portions joined with said differential casing, the method of forming a section of said axle housing which consists in bending the intermediate portion of a rectangular blank to provide a transversely disposed intermediate arcuate section, stretching the adjoining parts of said arcuate section and the end portions of said blank between the longitudinal sides thereof to a formation approaching the cross-sectional contour of said frusto-conical portions and simultaneously increasing the area of said blank at said adjoining parts, and then modifying said blank to its final shape between dies having the contour desired in the finished housing section.

5. In manufacturing a rear axle housing including an annular differential casing and tubular end parts having frusto-conical shaped inner end portions joined with said differential casing, the method of forming each complementary section of said axle housing which consists in forming the intermediate part of said blank to an arcuate shape, stretching only the spaced end portions of the arcuate intermediate part and the adjoining portions of the other parts of said blank to a formation approaching the cross-sectional contour of said frusto-conical portions and simultaneously increasing the area of said blank at the stretched portions thereof, and then modifying said blank to final shape between dies having the contour desired in the finished axle housing section.

6. In manufacturing a rear axle housing having a differential casing at its intermediate portion and including tubular end parts having flared portions adjacent said differential casing, the method of making a section of said housing from a rectangular blank of substantially uniform thickness which consists in bending the intermediate part of said blank to provide a transversely disposed intermediate arcuate section, die clamping the longitudinal edges of said blank against displacement at the adjoining portions of said arcuate section and the end parts of said blank, depressing the central areas of said adjoining portions to a formation approaching the contour of the flared ends of said tubular part in successive punching operations with punches of increasing dimensions while said edge portions of said blank are held against displacement so as to stretch the metal at said adjoining portions to the perimeters desired at the flared ends of the tubular parts of the housing, and modifying said blank to the formation of a finished section of a rear axle housing between dies having contours conforming with the inner and outer sides of an axle housing respectively.

ALBERT T. KAPITKE.
FREDERICK A. BAUROTH.